US010255561B2

(12) United States Patent
Howe

(10) Patent No.: US 10,255,561 B2
(45) Date of Patent: Apr. 9, 2019

(54) SYSTEM, METHOD AND APPARATUS FOR DETECTING ABSENT AIRLINE ITINERARIES

(71) Applicant: MasterCard International Incorporated, Purchase, NY (US)

(72) Inventor: Justin Xavier Howe, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 341 days.

(21) Appl. No.: 14/712,766

(22) Filed: May 14, 2015

(65) Prior Publication Data
US 2016/0335566 A1 Nov. 17, 2016

(51) Int. Cl.
*G06Q 10/02* (2012.01)
*G06Q 20/34* (2012.01)
*G06Q 40/00* (2012.01)
*G06Q 20/40* (2012.01)
*G06Q 20/42* (2012.01)

(52) U.S. Cl.
CPC ........... *G06Q 10/025* (2013.01); *G06Q 20/34* (2013.01); *G06Q 20/405* (2013.01); *G06Q 20/4016* (2013.01); *G06Q 20/425* (2013.01); *G06Q 40/12* (2013.12)

(58) Field of Classification Search
CPC .... G06Q 10/025; G06Q 20/34; G06Q 20/425; G06Q 20/4016
USPC .............. 705/5, 6, 7, 14, 307; 701/117, 533; 709/217; 715/771; 340/990; 235/384
See application file for complete search history.

(56) References Cited

U.S. PATENT DOCUMENTS

| 5,384,449 | A | 1/1995 | Peirce |
| 5,478,993 | A | 12/1995 | Derksen |
| 5,732,400 | A | 3/1998 | Mandler et al. |
| 5,774,670 | A | 6/1998 | Montulli |
| 5,819,226 | A | 10/1998 | Gopinathan et al. |
| 6,035,285 | A | 3/2000 | Schlect et al. |
| 6,924,739 | B1 | 8/2005 | Infosino |
| 6,926,203 | B1 | 8/2005 | Sehr |
| 6,963,740 | B1 | 11/2005 | Guthery et al. |
| 7,203,665 | B2 | 4/2007 | Donner |
| 7,653,599 | B2 | 1/2010 | Doran et al. |
| 8,478,638 | B2 * | 7/2013 | Postrel ................. G06Q 20/105 705/14.1 |
| 8,620,780 | B2 * | 12/2013 | Krakowiecki ....... G06Q 40/025 705/30 |
| 9,489,680 | B2 * | 11/2016 | Baker ................ G06Q 30/0207 |

(Continued)

FOREIGN PATENT DOCUMENTS

| AU | 2016308130 | 2/2018 |
| CA | 2995950 | 2/2018 |

(Continued)

OTHER PUBLICATIONS

U.S. Appl. No. 13/890,518 (US-2014-0337062-A1), filed May 9, 2013 (Nov. 13, 2014), Justin X. Howe.

(Continued)

*Primary Examiner* — Vanel Frenel
(74) *Attorney, Agent, or Firm* — Ballard Spahr LLP

(57) ABSTRACT

A system, method, and non-transitory computer-readable storage medium to detect absent airline itineraries.

20 Claims, 3 Drawing Sheets

(56) References Cited

U.S. PATENT DOCUMENTS

| | | |
|---|---|---|
| 2002/0051521 A1 | 5/2002 | Patrick |
| 2002/0100803 A1* | 8/2002 | Sehr .................. G06Q 10/02 235/384 |
| 2002/0139837 A1 | 10/2002 | Spitz et al. |
| 2002/0173996 A1* | 11/2002 | Murch ................ G06Q 10/02 705/5 |
| 2003/0078850 A1 | 4/2003 | Hartman et al. |
| 2003/0182052 A1* | 9/2003 | DeLorme .............. G01C 21/26 701/533 |
| 2003/0200135 A1 | 10/2003 | Wright |
| 2004/0034570 A1 | 2/2004 | Davis |
| 2004/0050928 A1 | 3/2004 | Bishop et al. |
| 2004/0064405 A1 | 4/2004 | Weichert et al. |
| 2004/0125137 A1 | 7/2004 | Stata et al. |
| 2004/0203860 A1 | 10/2004 | Fellenstein et al. |
| 2005/0097051 A1 | 5/2005 | Madill et al. |
| 2005/0107997 A1 | 5/2005 | Watts et al. |
| 2006/0010101 A1 | 1/2006 | Suzuki et al. |
| 2006/0085308 A1 | 4/2006 | Metzger |
| 2007/0094061 A1 | 4/2007 | Hu et al. |
| 2007/0118449 A1 | 5/2007 | De La Motte |
| 2007/0192249 A1 | 8/2007 | Biffle et al. |
| 2007/0203732 A1 | 8/2007 | Griegel et al. |
| 2007/0203804 A1 | 8/2007 | Kargman |
| 2007/0294195 A1 | 12/2007 | Curry et al. |
| 2008/0281741 A1 | 11/2008 | Hyde |
| 2009/0081947 A1 | 3/2009 | Margis |
| 2009/0276305 A1 | 11/2009 | Clopp |
| 2009/0276318 A1 | 11/2009 | Broadbent et al. |
| 2009/0287768 A1 | 11/2009 | Tanaka |
| 2010/0023455 A1 | 1/2010 | Dispensa et al. |
| 2010/0076829 A1 | 3/2010 | Bishop |
| 2010/0241535 A1 | 9/2010 | Nightengale et al. |
| 2010/0274649 A1 | 10/2010 | Smith |
| 2010/0299211 A1 | 11/2010 | Wu |
| 2010/0299716 A1 | 11/2010 | Rouskov et al. |
| 2010/0301114 A1 | 12/2010 | Lo Faro et al. |
| 2011/0071906 A1 | 3/2011 | Kamiyama et al. |
| 2011/0078021 A1* | 3/2011 | Tullis .................. G06O 30/02 705/14.53 |
| 2011/0087591 A1 | 4/2011 | Barnett et al. |
| 2011/0208601 A1 | 8/2011 | Ferguson et al. |
| 2011/0295711 A1 | 12/2011 | Mazmanyan |
| 2011/0302011 A1 | 12/2011 | Yoder et al. |
| 2012/0065800 A1 | 3/2012 | Baba et al. |
| 2012/0096491 A1 | 4/2012 | Shkedi |
| 2012/0124617 A1 | 5/2012 | Krishnamoorthy et al. |
| 2012/0232917 A1 | 9/2012 | Al-Khudairy et al. |
| 2012/0244885 A1 | 9/2012 | Hefetz |
| 2013/0006823 A1 | 1/2013 | DePetro |
| 2013/0006858 A1* | 1/2013 | DePetro ............. G06Q 20/3224 705/44 |
| 2013/0018795 A1 | 1/2013 | Kolhatkar et al. |
| 2013/0024242 A1 | 1/2013 | Villars et al. |
| 2013/0046717 A1 | 2/2013 | Grigg et al. |
| 2013/0103217 A1 | 4/2013 | Tadano |
| 2013/0110833 A1 | 5/2013 | Fredericks et al. |
| 2013/0268318 A1 | 10/2013 | Richard |
| 2013/0282581 A1 | 10/2013 | Singh |
| 2013/0310996 A1 | 11/2013 | Boss et al. |
| 2014/0025410 A1* | 1/2014 | Churchman ........... G06Q 10/06 705/6 |
| 2014/0058815 A1* | 2/2014 | Hiremath ........... G06Q 30/0215 705/14.17 |
| 2014/0337062 A1 | 11/2014 | Howe |
| 2015/0006529 A1 | 1/2015 | Kneen et al. |
| 2015/0012430 A1 | 1/2015 | Chisholm et al. |
| 2015/0026070 A1 | 1/2015 | Groarke et al. |
| 2015/0046220 A1 | 2/2015 | Gerard et al. |
| 2015/0046302 A1 | 2/2015 | Hu et al. |
| 2015/0057837 A1* | 2/2015 | Moore, Jr. ............ G06Q 10/02 701/2 |
| 2015/0081362 A1* | 3/2015 | Chadwick ............ G06Q 50/30 705/7.14 |
| 2015/0088752 A1 | 3/2015 | Howe |
| 2015/0101062 A1 | 4/2015 | Silver et al. |
| 2015/0161610 A1 | 6/2015 | Sahadevan et al. |
| 2015/0170135 A1* | 6/2015 | Fourez .................. G06Q 20/32 705/21 |
| 2015/0317613 A1 | 11/2015 | Clark |

FOREIGN PATENT DOCUMENTS

| | | |
|---|---|---|
| CN | 201680058174.0 | 4/2018 |
| EP | 2482244 A2 | 8/2012 |
| JP | 2018-509577 | 4/2018 |
| WO | WO-03/034633 A2 | 4/2003 |
| WO | WO-2013/078541 A1 | 6/2013 |
| WO | PCT/US2015/051859 | 9/2015 |
| WO | PCT/US2016/047302 | 8/2016 |

OTHER PUBLICATIONS

U.S. Appl. No. 13/956,161 (US-2014-0337217-A1), filed Jul. 31, 2013 (Nov. 13, 2014), Justin X. Howe.

U.S. Appl. No. 13/963,284 (US-2015-0046302-A1), filed Aug. 9, 2013 (Dec. 12, 2015), Hu et al.

U.S. Appl. No. 13/964,728 (US-2015-0046220-A1), filed Aug. 12, 2013 (Dec. 12, 2015), Gerard et al.

U.S. Appl. No. 14/038,259 (US 2015-0088735 A1), filed Sep. 26, 2013 (Mar. 26, 2015), Justin X. Howe.

U.S. Appl. No. 14/183,220 (US-2015-0235321-A1), filed Feb. 18, 2014 (Aug. 20, 2015), Unser et al.

U.S. Appl. No. 14/591,714 (US-2015-0235222-A1), filed Jan. 7, 2015 (Aug. 20, 2015), Howe et al.

U.S. Appl. No. 14/226,108 (US-2015-0278854-A1), filed Mar. 26, 2014 (Oct. 1, 2015), Justin X. Howe.

U.S. Appl. No. 14/495,165 (US-2016-0086182-A1), filed Sep. 24, 2014 (Mar. 24, 2016), Howe et al.

U.S. Appl. No. 14/491,111 (U.S. Pat. No. 9,275,352), filed Sep. 19, 2014 (Mar. 1, 2016), Justin X. Howe.

U.S. Appl. No. 14/731,492, filed Jun. 5, 2015, Justin X. Howe.

U.S. Appl. No. 14/563,148 (US-2016-0162810-A1), filed Dec. 8, 2014 (Jun. 9, 2016), Justin X. Howe.

U.S. Appl. No. 14/532,486 (US-2016-0125485-A1), filed Nov. 4, 2014 (May 5, 2016), Justin X. Howe.

U.S. Appl. No. 14/831,756, filed Aug. 20, 2015, Howe et al.

U.S. Appl. No. 14/814,366 (US-2015-0332295-A1), filed Jul. 30, 2015 (Nov. 19, 2015), Unser et al.

International Search Report and Written Opinion dated Dec. 22, 2015 for Application No. PCT/US2015/051859, which was filed on Sep. 24, 2015 and published as WO2016/049271 on Mar. 31, 2016 (Inventor—Howe et al; Applicant—MasterCard International, Inc.) (9 Pages).

Non-Final Office Action dated Oct. 22, 2014 for U.S. Appl. 13/956,161, filed Jul. 31, 2013 and published as U.S. 2014/0337217 on Nov. 13, 2014 (Inventor Howe; Applicant—Mastercard International Incorporated) (13 Pages).

Non-Final Office Action dated Apr. 3, 2015 for U.S. Appl. No. 13/956,161, filed Jul. 31, 2013 and published as U.S. 2014/0337217 on Nov. 13, 2014 (Inventor—Howe; Applicant—Mastercard International Incorporated) (18 Pages).

Non-Final Office Action dated Dec. 31, 2014 for U.S. Appl. No. 13/963,284, filed Aug. 9, 2013 and published on Feb. 12, 2015 as 2015-0046302 (Applicant—MasterCard International, Inc. // Inventor—Hu, et al.) (8 pages).

Response to Non-Final Office Action filed in Mar. 31, 2015 for U.S. Appl. No. 13/963,284, filed Aug. 9, 2013 and published on Feb. 12, 2015 as 2015-0046302 (Applicant—MasterCard International, Inc. // Inventor—Hu, et al.) (11 pages).

Final Office Action dated Apr. 16, 2014 for application 13/963,284, filed Aug. 9, 2013 and published on Feb. 12, 2015 as 2015-0046302 (Applicant—MasterCard International, Inc. // Inventor—Hu, et al.) (13 pages).

Non-Final Office Action dated May 11, 2015 for U.S. Appl. No. 14/183,220, filed Feb. 18, 2014 (Applicant—MasterCard International, Inc. // Inventor—Unser, et al.) (17 pages).

(56) References Cited

OTHER PUBLICATIONS

Non-Final Office Action dated May 6, 2015 for U.S. Appl. No. 14/591,714, filed Jan. 7, 2015 (Applicant—MasterCard International, Inc. // Inventor—Howe, et al.) (10 pages).

International Search Report and Written Opinion dated Nov. 11, 2016 by the International Searching Authority for Patent Application No. PCT/US2016/047302, which was filed on Aug. 17, 2016 and published as WO 2017/031181 on Feb. 23, 2017 (Inventor—Howe et al.; Applicant—Mastercard International, Inc.) (8 pages).

International Preliminary Report on Patentability dated Feb. 20, 2018 by the International Searching Authority for Patent Application No. PCT/US2016/047302, which was filed on Aug. 17, 2016 and published as WO 2017/031181 on Feb. 23, 2017 (Inventor—Howe et al.; Applicant—Mastercard International, Inc.) (6 pages).

* cited by examiner

SYSTEM, METHOD AND APPARATUS FOR DETECTING ABSENT AIRLINE ITINERARIES

BACKGROUND

Field of the Disclosure

Aspects of the disclosure relate in general to financial services. Aspects include an apparatus, system, method and computer-readable storage medium to detect absent airline itineraries.

Description of the Related Art

A payment card is a card that can be used by a cardholder and accepted by a merchant to make a payment for a purchase or in payment of some other obligation. Payment cards include credit cards, debit cards, charge cards, and Automated Teller Machine (ATM) cards.

Payment cards provide clients of a financial institution ("cardholders") with an ability to pay for goods and services without the inconvenience of using cash. For example, traditionally, whenever travelers leave home, they carried large amounts of cash to cover journey expenditures, such as transportation, lodging, and food. Payment cards eliminate the need for carrying large amounts of currency. Moreover, in international travel situations, payment cards obviate the hassle of changing currency.

Traditionally, financial institutions that issue payment cards ("issuers") work to prevent fraud in the use of such cards. One simple way issuers detect and attempt to prevent fraud is detect and prevent use of the payment card in locations other than the location where the cardholder typically uses the payment card, and particularly in foreign countries. Accordingly, before travelling internationally, a cardholder would contact the issuer of upcoming travel. The cardholder's notification allowed the cardholder to continue use of the payment card internationally, but is traditionally viewed as onerous, and can serve as a barrier for cardholders to use payment cards during travel.

In an effort to provide convenience to cardholders, the issuers attempt to automatically retrieve itinerary information for cardholders when such information is available to the issuer. However, the itinerary information is not consistently available. Accordingly, cardholders are still required to contact the issuer prior to travel to avoid their payment card transactions being prevented due to fraud prevention methods.

Accordingly, there is a need for determining that itinerary records are absent, and for informing cardholders about absent itinerary records.

SUMMARY

Embodiments include a system, device, method and computer-readable medium to detect absent airline itineraries.

In a first aspect, a real-time method of detecting absent travel itineraries is provided. The method can include receiving, via a network interface, transaction data from a merchant bank. The transaction data includes a transaction amount, a primary account number associated with a cardholder, and one or more of a merchant category code, merchant name, and/or merchant identifier. The network interface also receives registered travel information from one or more third party sources (e.g., a Global Distribution System database, a Billing Service Provider, a third party application, a web scraping service, an email scraping service, an aggregator, or the like). A processor determines that a transaction of the received transaction data is a travel transaction based on at least the merchant category code, merchant name, and/or merchant identifier, and the transaction amount, and compares the transaction information of the travel transaction to the received registered travel information to identify whether any registered travel record is missing. Finally, the cardholder is notified via the network interface if any registered travel record is missing for the travel transaction.

In another aspect, a system for detecting absent travel itineraries includes a network interface that receives transaction data from a merchant bank and travel information from one or more third party sources (e.g., a Global Distribution System database, a Billing Service Provider, a third party application, a web scraping service, an email scraping service, an aggregator, or the like), the transaction data including a transaction amount, a primary account number associated with a cardholder, and one or more of a merchant category code, a merchant name, and a merchant identifier. A determining unit can determine that a transaction of the received transaction data is a travel transaction based on at least the merchant category code, merchant name, and/or merchant identifier and the transaction amount. A comparison unit can compare the transaction information of the travel transaction to the received travel information to determine if any registered travel record is missing. A notification unit can notify the cardholder if any registered travel record is missing for the travel transaction.

In still another aspect, a non-transitory computer readable medium is encoded with data and instructions that, when executed by a computing device cause the computing device to perform a step of receiving, via a network interface, transaction data from a merchant bank, the transaction data including a transaction amount, a primary account number associated with a cardholder, and one or more of a merchant category code, a merchant name, and/or a merchant identifier. The computer also receives, via the network interface, registered travel information from one or more of a Global Distribution System database and a Billing Service Provider database. Further, the computer determines that a transaction of the received transaction data is a travel transaction based on at least the merchant category code, merchant name, and/or merchant identifier and the transaction amount and compares the transaction information of the travel transaction to the received registered travel information to determine if any registered travel record is missing. Finally, the code causes the computer to notify the cardholder if any registered travel record is missing for the travel transaction.

DETAILED DESCRIPTION

It is understood by those familiar with the art that the term "payment card" includes credit cards, debit cards, charge cards, and Automated Teller Machine (ATM) cards. In addition to payment cards, it is understood by those familiar with the art that the embodiments described herein apply equally to payments via payment devices. Payment devices include payment cards, mobile devices (such as key fobs, mobile phones, tablet computers, and the like), electronic wallets, virtual payment cards, cloud-based payment devices, cashless payment devices/methods, or computers.

The systems and processes are not limited to the specific embodiments described herein. In addition, components of each system and each process can be practiced independently and separately from other components and processes described herein. Each component and process also can be used in combination with other assembly packages and processes.

Figure 1:
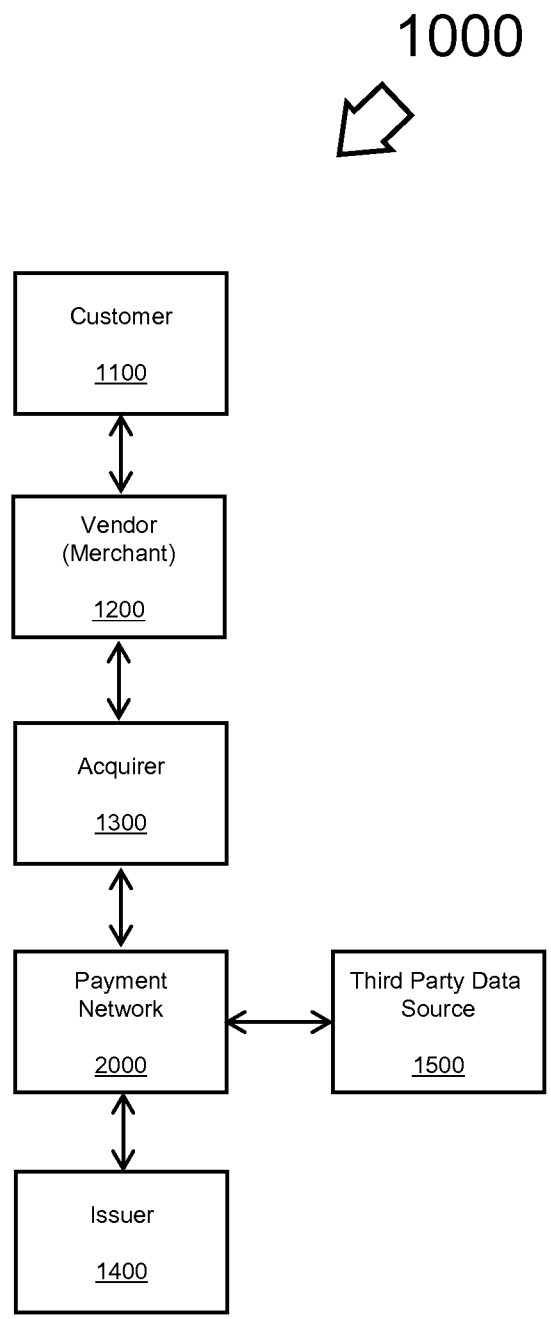
FIG. 1 is a block diagram illustrating a financial transaction using a payment card payment system and receiving information from a third party data source.

FIG. 1 is a block diagram 1000 illustrating a financial transaction using a payment card payment system and receiving data from a third party data source 1500.

For sake of example only, the present disclosure will describe a payment network-based system, such as the payment system using the MasterCard® interchange, Cirrus® network, or Maestro®. The MasterCard interchange is a proprietary communications standard promulgated by MasterCard International Incorporated for the exchange of financial transaction data between financial institutions that are customers of MasterCard International Incorporated. Cirrus is a worldwide interbank network operated by MasterCard International Incorporated linking debit and payment cards to a network of ATMs throughout the world. Maestro is a multi-national debit card service owned by MasterCard International Incorporated.

In a financial payment system, a financial institution called the "issuer" 1400 issues a payment device to a customer 1100, who uses a payment device to tender payment at a vendor 1200.

In one example, a cardholder presents the payment device at a vendor 1200. Vendor 1200 may be a merchant, or any provider of goods or services.

The vendor 1200 is affiliated with a financial institution. This financial institution is usually called the "acquiring bank," "merchant bank" or "acquirer" 1300. When a payment device is tendered at a vendor 1200, the vendor 1200 electronically requests authorization from the acquirer 1300 for the amount of the purchase. The request is performed electronically with the consumer's account information or other identifier from the payment device. For example, the information may be transmitted electronically via Near Field Communication (NFC). In payment card embodiments, the customer account information may be received from the magnetic stripe on the payment card or for CHIP enabled payment cards, via the computer chip imbedded within the card. The account information and transaction information are forwarded to transaction processing computers of the acquirer 1300. Alternatively, an acquirer 1300 may authorize a third party to perform transaction processing on its behalf. In this case, the vendor 1200 will be configured to communicate with the third party. Such a third party is usually called a "merchant processor" or an "acquiring processor."

Using a payment network 2000, the computers of the acquirer 1300 or the merchant processor will communicate via an interbank network authorization message or PIN network with the computers of the issuer 1400 to determine whether the consumer's account is in good standing and whether the transaction is likely to be fraudulent.

When a request for authorization is accepted, the available credit balance of the cardholder's account is decreased, and a payment is later made to the vendor 1200 via the acquirer 1300.

After a transaction is captured, the transaction is settled between the vendor 1200, the acquirer 1300, and the issuer 1400, and reconciled. The reconciliation process is known as a "clearing process," and is generally performed as a batch process. During the clearing process, the vendor 1200 or acquirer 1300 provides encoded details of the transaction to the payment network 2000. The transaction detail includes interchange rate/category for the transaction, the time/date of the transaction, the type of transaction, where the transaction occurred, the amount of the transaction and the Primary Account Number (PAN) of the payment device involved in the transaction of any other transaction data elements as defined in International Organization for Standardization standard for systems that exchange electronic transactions made by cardholders using payment cards (ISO 8583). Additionally, vendors may attach addendum details to the transaction information.

During the clearing process, payment network 2000 uses the received addenda information. However, the addenda information received in the payment data can be inaccurate, incomplete, or absent altogether. Accordingly, the addenda information is compared to the reported interchange rate/category, verifying that information is consistent. Suppose a cardholder purchased a travel-related service from a vendor 1200, such as plane, train, bus, or other travel tickets, hotels, rental-cars and the like. The vendor would report a merchant category code, merchant name, and/or merchant identifier for the service. For example, suppose the cardholder is purchasing plane tickets from New York City to London, England. The merchant category code (MCC), merchant name, and/or merchant identifier would reflect a travel purchase. Addendum details can include itinerary information such as dates of travel, the airline and flight number, and origination/destination airport codes for the flights.

This itinerary information can alternatively be supplied from a third party data source 1500 (e.g., a Global Distribution System database (GDS), a Billing Service Provider (BSP), a third party application, a web scraping service, an email scraping service, an aggregator, or other travel data provider). As understood in the art, a GDS is generally a network that enables transactions between travel service providers (e.g., airlines, train operators, rental car companies) and travel reservation agents in order to provision travel-related services to end users. A BSP is generally a network that facilitates payment processing for travel service providers (e.g., airlines, train operators, rental car companies). When information is reported from a GDS or a BSP, it typically is reported after purchase from the travel service provider (i.e., after acceptance of the payment request by the issuer), but prior to clearing. For example, itinerary information from a GDS or BSP can arrive approximately 24 hours after acceptance of the payment request by the issuer. Information provided through either a GDS or BSP is known to be accurate and thus can be useful in a fraud prevention context. When itinerary information is known, the information can be provided to the issuer so that the issuer is aware of cardholder travel plans for fraud prevention purposes.

However, some transactions simply do not include any itinerary information even when travel has been booked through a travel service provider. In cases where itinerary information is absent, it is desirable to inform the cardholder that the cardholder should contact the issuer to notify the issuer of the upcoming travel itinerary so that the cardholder is able to use the payment device while traveling.

Figure 2:
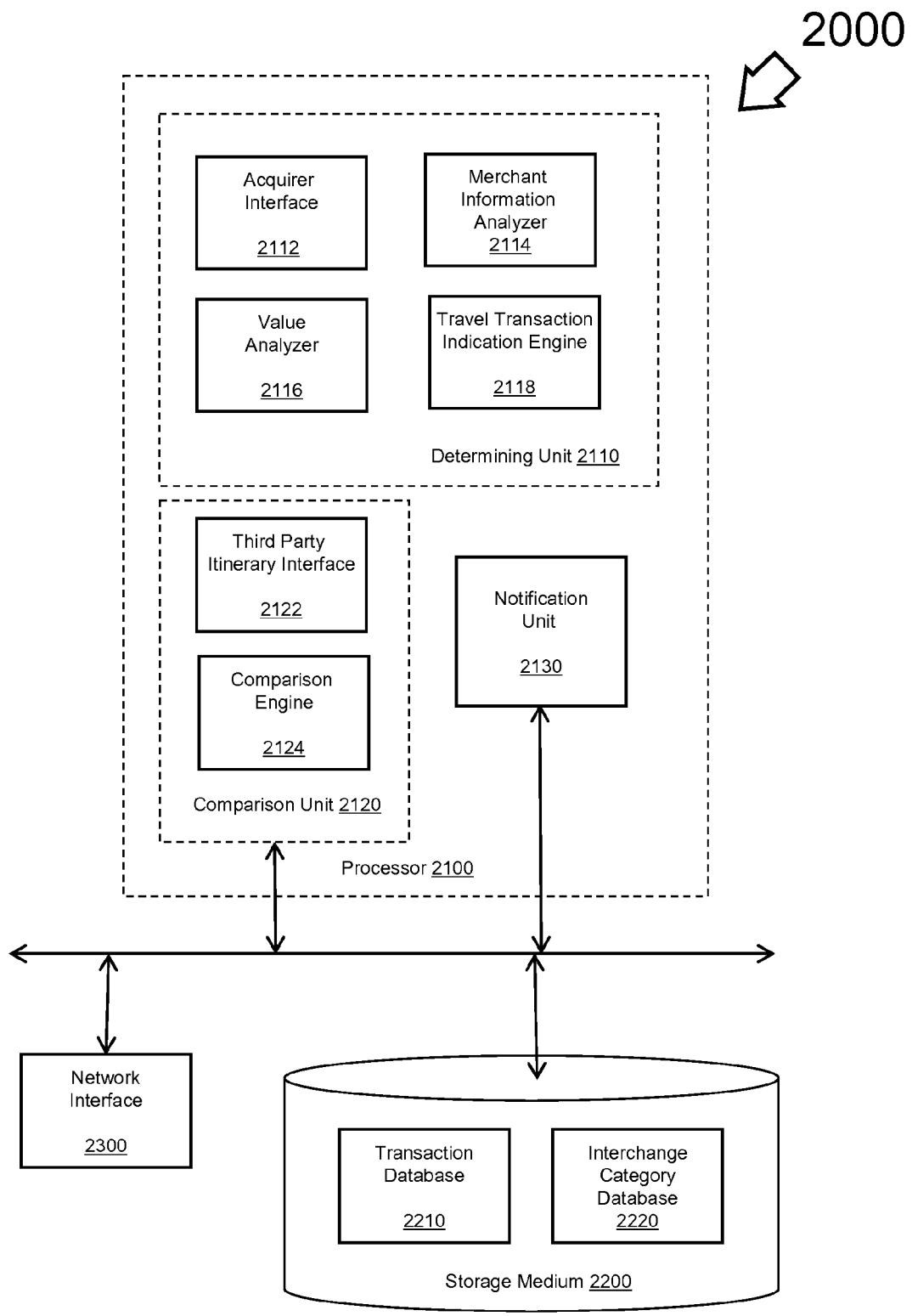
FIG. 2 is an expanded block diagram of an exemplary embodiment of a server architecture of a payment card network embodiment configured to detect absent airline itineraries.

Embodiments will now be disclosed with reference to a block diagram of an exemplary payment network server of FIG. 2, configured to detect absent airline itineraries, constructed and operative in accordance with an embodiment of the present disclosure.

The payment network server may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art. It is understood that processor 2100 may temporarily store data and instructions in a Random Access Memory (RAM) (not shown), as is known in the art.

As shown in FIG. 2, the processor 2100 functionally includes a determining unit 2110, a comparison unit 2120, and a notification unit 2130.

The determining unit 2110 is the unit that receives transaction information from the acquirer, analyzes the transaction information, and determines, for each received transaction, whether the transaction is a travel transaction. The determining unit 2110 can comprise an acquirer interface 2112, a merchant information analyzer 2114, a value analyzer 2116, and travel transaction indication engine 2118.

The acquirer interface 2112 is a structure configured to receive transaction information from an acquirer during the clearing process.

The merchant information analyzer 2114 is a structure configured to compare the merchant category codes, merchant names, and/or merchant identifiers for each transaction in the transaction information received through the acquirer interface 2112 with a predefined list of merchant category codes, merchant names, and merchant identifiers that correspond to transactions processed by travel service providers.

The value analyzer 2116 is a structure configured to compare the value of each transaction in the transaction information received through the acquirer interface 2112 to determine if the value of the received transaction exceeds a predetermined threshold value.

The travel transaction indication engine 2118 receives output from both the merchant information analyzer and the value analyzer and determines if the received transaction likely corresponds to a purchase of travel services on the basis of those outputs.

Figure 3:
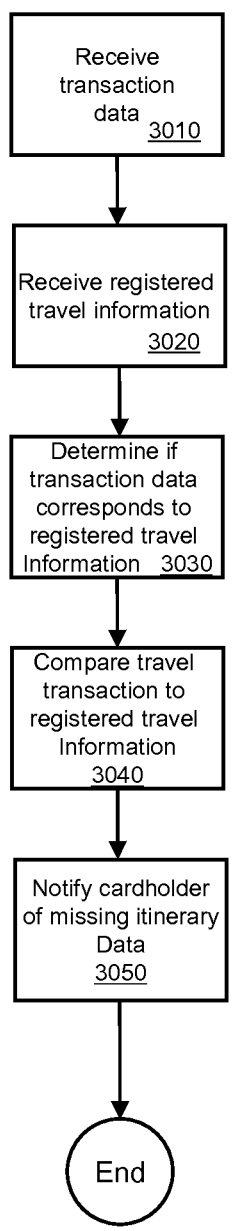
FIG. 3 illustrates a method to detect absent airline itineraries.

The functionality of all the determining unit 2110 structures is elaborated in greater detail in FIG. 3. Each of these structures (i.e., the acquirer interface 2112, the merchant information analyzer 2114, the value analyzer 2116, and the travel transaction indication engine 2118) can be implemented as hardware, firmware, or software encoded on a computer readable medium, such as storage medium 2200. Further details of these components are described with their relation to method embodiments below.

The comparison unit 2120 is the unit that receives registered travel information, including one or more travel records, from a third party service such as a GDS or a BSP and determines if the travel transaction determined in the determining unit 2110 corresponds to a received third party travel record. The comparison unit can include a third party itinerary interface 2122 and a comparison engine 2124.

The third party itinerary interface 2122 receives the registered travel information, including the one or more travel records, from one or more third party platform (e.g., the GDS/BSP). As examples, the third party itinerary interface 2122 can receive travel records from one or more GDS and/or one or more BSP.

The comparison engine 2124 compares the received travel records with information relating to the travel transactions identified by the determining unit 2110 to determine if one of the received travel records corresponds to a travel transaction. As an example, the comparison engine can compare the passenger name and cost from the travel record to the cardholder name and cost from the travel transaction. When the comparison engine 2124 determines that a particular travel transaction does not correspond to any of the received travel records (e.g., a travel record is absent), the comparison engine adds the travel transaction to a list of travel transactions for which no corresponding travel record is present.

The notification unit 2130 can receive the list of travel transactions for which no corresponding travel record is present. For each transaction included on the list of travel transactions for which no corresponding travel record is present, the notification unit 2130 can retrieve contact information related to the primary cardholder associated with the account used to make the travel purchase. As examples, the contact information can include an email address, a telephone number, and/or a mailing address. The notification unit can transmit a notification to the cardholder using the retrieved contact information. In an aspect, the notification can include an indication that a travel transaction associated with the cardholder account was identified, and an indication that the cardholder should contact the issuer to notify the issuer of upcoming travel plans. The notification can be delivered via email, a voice message delivered via telephone, a mailing, a text message delivered via Short Message Service (SMS), and the like. Alternatively, the notification can include an electronic message delivered to the issuer, with instruction that the issuer should contact the cardholder.

The non-transitory computer-readable storage medium 2200 can include one or more conventional read/write memory technologies such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, the non-transitory computer-readable storage medium 2200 may be remotely located from processor 2100, and be connected to processor 2100 via a network such as a local area network (LAN), a wide area network (WAN), or the Internet.

In addition, as shown in FIG. 2, the non-transitory computer-readable storage medium 2200 can also contain a transaction database 2210, and an interchange category database 2220. Transaction database 2210 stores transaction data received from acquirer interface 2112 during the clearing process. Interchange category database 2220 stores the interchange rates and categories recognized by payment network 2000. It is understood by those familiar with the art that one or more of these databases 2210-2220 may be combined in myriad combinations.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows the payment network server to communicate with the vendor 1200 and the issuer 1400, as well as with one or more third party platforms, such as a GDS and/or a BSP.

We now turn our attention to method or process embodiments of the present disclosure, FIG. 3. It is understood by those familiar with the art that instructions for such method embodiments may be stored on their respective computer-readable memories and executed by their respective processors. It is understood by those skilled in the art that other equivalent implementations can exist without departing from the spirit or claims of the disclosure.

FIG. 3 illustrates a process 3000 to notify cardholders of travel transactions where the issuer lacks a travel record, constructed and operative in accordance with an embodiment of the present disclosure. It is understood by those familiar with the art that process 3000 can be a real time process, but in alternate embodiments may be a non-real time process. Furthermore, it is understood that process 3000 or variations thereof may occur at an issuer 1400, at a payment network 2000, or at a third party data source, such as a GDS or BSP. For the sake of example only, this disclosure will discuss a payment network 2000 embodiment.

At block 3010, the payment network 2000 receives transaction data from a merchant bank or acquirer 1300. The transaction data is received electronically via a network interface 2300 and processed using an acquirer interface 2112. The transaction data may be part of data from many transactions received via a batch process. As an example, the received transaction data can include a transaction amount, a primary account number associated with a cardholder, a merchant category code, merchant name, or merchant identifier associated with the transaction, and the like.

At block 3020, the payment network 2000 receives registered travel information, including one or more travel records, from a third party data source, such as a GDS or a BSP. The registered travel information can be received electronically via the network interface 2300 and processed through a third party itinerary interface 2122.

At block 3030, the received transaction data is analyzed to determine if the data corresponds to a travel transaction. As an example, the received transaction data can be processed by a merchant information analyzer 2114 to determine if the merchant category code, merchant name, and/or merchant identifier associated with the transaction corresponds to a travel services provider (e.g., an airline, a train operator, a rental car company) or a travel agent. In addition to the merchant information analyzer, the transaction data can be processed by a value analyzer 2116 to determine if the value exceeds a predetermined amount.

At block 3040, transaction information of a transaction determined to be a travel transaction is compared to the received registered travel information. The comparison can be processed by a comparison engine 2124. The comparison determines, for each travel transaction, if any received registered travel record corresponds to the transaction data of the travel transaction. For example, the comparison engine 2124 can compare the transaction amount of the travel transaction to the ticket price of the registered travel information. As another example, the comparison engine can compare a cardholder name associated with the travel transaction to a name associated with the registered travel record. When the comparison determines that a particular travel transaction does not correspond to any of the received registered travel records in the registered travel information (e.g., a travel record is absent), the travel transaction is added to a list of travel transactions for which no corresponding travel record is present. Optionally, the comparison engine can also be used to verify that the received registered travel information associated with the travel transaction is complete (i.e., no data is missing).

At block 3050, the payment network server 2000 notifies cardholders if a travel record is missing for the travel transaction. This includes, for example, if the registered travel record is entirely absent. In particular, for each transaction included on the list of travel transactions for which no corresponding travel record is present, contact information related to the primary cardholder associated with the account used to make the travel purchase can be retrieved. The notification can be sent via the network interface 2300, and can include, for example, an SMS message, an email, a telephone call, or a written letter. In one aspect, the notification can be sent directly to the cardholder, and can include an indication that the cardholder should contact the issuer to confirm travel. In another aspect, the notification can be transmitted to the issuer, with an indication that the issuer should contact the cardholder. Optionally, the notifications can also be issued for transactions in which one or more pieces of information in the travel record (e.g., destination, travel dates, etc.) are missing from the registered travel information.

Process 3000 then ends.

It is understood by those familiar with the art that the system described herein may be implemented in hardware, firmware, or software encoded on a non-transitory computer-readable storage medium. It is also understood by those familiar with the art that, while the steps described in the method or process embodiments have been numbered and ordered, it is not necessary that the steps be performed in the order presented.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
   receiving, via a network interface, from a merchant bank, payment transaction data comprising a primary account number associated with a cardholder, a merchant category code, a merchant name, and a merchant identifier;
   receiving, via the network interface, from at least one third party data source, registered travel information comprising a plurality of travel transaction records, wherein each of the plurality of travel transaction records comprises a name and a ticket price, and wherein the at least one third party data source is either a network that enables transactions between travel service providers and travel reservation agents or a network that facilitates payment processing for travel service providers;
   determining, using a processor, based on one or more of the merchant category code, the merchant name, or the merchant identifier, that the payment transaction data is a travel transaction record;
   determining that the payment transaction data is inaccurate or incomplete by:

determining, using the processor, based on the payment transaction data and the registered travel information, that neither any name nor any ticket price associated with any travel transaction record of the plurality of travel transaction records is associated with the payment transaction data; and responsive to determining that the payment transaction data is inaccurate or incomplete, transmitting, via the network interface an automated alert to the cardholder.

2. The method of claim 1, wherein transmitting the automated alert to the cardholder comprises:
determining, using the processor, cardholder contact information based on the primary account number; and
transmitting, via the network interface, based on the cardholder contact information, the automated alert to the cardholder.

3. The method of claim 2, wherein transmitting the automated alert to the cardholder comprises transmitting, via the network interface, one or more of an e-mail, a text message, or a voice message.

4. The method of claim 1, wherein the payment transaction data further comprises a transaction amount, and wherein determining that the payment transaction data is a travel transaction record comprises:
determining, with the processor, that one or more of the merchant category code, the merchant name, or the merchant identifier are associated with a travel service provider or a travel reservation agent; and
determining, with the processor, that the transaction amount is greater than or equal to a predefined threshold value.

5. The method of claim 1, wherein the registered travel information is received after the payment transaction data is received.

6. The method of claim 1, wherein transmitting an automated alert to the cardholder comprises:
transmitting, via the network interface, to an issuer associated with the cardholder, a message indicating that neither any name nor any ticket price associated with any travel transaction record of the plurality of travel transaction records is associated with the payment transaction data, wherein the message comprises an instruction to alert the cardholder to contact the issuer.

7. The method of claim 6, wherein the issuer is a financial institution.

8. A system comprising:
a network interface configured to receive:
payment transaction data from a merchant bank, wherein the payment transaction data comprises a primary account number associated with a cardholder, a merchant category code, a merchant name, and a merchant identifier, and
registered travel information from one or more of a Global Distribution System database or a Billing Service Provider database, wherein the registered travel information comprises a plurality of travel transaction records, wherein each of the plurality of travel transaction records comprises a name and a ticket price;
a determining unit configured to determine, based on one or more of the merchant category code, the merchant name, or the merchant identifier, that the payment transaction data is a travel transaction record;
the determining unit further configured to determine that the payment transaction data is inaccurate or incomplete by:
determining, based on the payment transaction data and the registered travel information, that neither any name nor any ticket price associated with any travel transaction record of the plurality of travel transaction records is associated with the payment transaction data is not associated with any of the travel transaction records; and
a transmitter configured to transmit, responsive to determining that the payment transaction data is inaccurate or incomplete, an automated alert to the cardholder.

9. The system of claim 8, wherein the determining unit is further configured to determine cardholder contact information, based on the primary account number, and the transmitter is further configured to transmit the automated alert to the cardholder based on the cardholder contact information.

10. The system of claim 9, wherein the transmitter is further configured to transmit the automated alert as one or more of an e-mail, a text message, or a voice message.

11. The system of claim 8, wherein the payment transaction data further comprises a transaction amount, and wherein determining that the payment transaction data is associated with a travel transaction record comprises:
the determining unit further configured to determine that one or more of the merchant category code, the merchant name, or the merchant identifier are associated with a travel service provider or a travel reservation agent, and
the determining unit further configured to determine that the transaction amount is greater than or equal to a predefined threshold value.

12. The system of claim 8, wherein the network interface is configured to receive the registered travel information after the payment transaction data is received.

13. The system of claim 8, wherein the transmitter is further configured to transmit, to an issuer associated with the cardholder, a message indicating neither any name nor any ticket price associated with any travel transaction record of the plurality of travel transaction records is associated with the payment transaction data, wherein the message comprises an instruction to alert the cardholder to contact the issuer.

14. A non-transitory computer readable medium encoded with data and instructions that, when executed by a computing device, cause the computing device to:
receive, via a network interface, from a merchant bank, payment transaction data, comprising a primary account number associated with a cardholder, a merchant category code, a merchant name, and a merchant identifier;
receive, via the network interface, from at least one of a Global Distribution System database or a Billing Service Provider database, registered travel information comprising a plurality of travel transaction records, wherein each of the plurality of travel transaction records comprises a name and a ticket price;
determine, using a processor of the computing device, based on one or more of the merchant category code, the merchant name, or the merchant identifier, that the payment transaction data is a travel transaction record;
determine that the payment transaction data is inaccurate or incomplete by:
determining, using the processor of the computing device, based on the payment transaction data and the registered travel information, that neither any name nor any ticket price associated with any travel transaction record of the plurality of travel transaction records is associated with the payment transaction data; and responsive to determining that the payment transaction data is inaccurate or incomplete, transmit, via the network interface, an automated alert to the cardholder.

15. The non-transitory computer readable medium of claim 14, wherein transmitting the automated alert to the cardholder comprises:

determining, using the processor of the computing device, cardholder contact information based on the primary account number; and transmitting, via the network interface, based on the cardholder contact information, the automated alert to the cardholder.

16. The non-transitory computer readable medium of claim 15, wherein transmitting the automated alert to the cardholder comprises transmitting, via the network interface, one or more of an email, a text message, or a voice message.

17. The non-transitory computer readable medium of claim 14, wherein the payment transaction data further comprises a transaction amount, and wherein determining that the payment transaction data is a travel transaction record comprises:

determining, with the processor, that one or more of the merchant category code, the merchant name, or the merchant identifier are associated with a travel service provider or a travel reservation agent; and determining, with the processor, that the transaction amount is greater than or equal to a predefined threshold value.

18. The non-transitory computer readable medium of claim 14, wherein transmitting an automated alert to the cardholder comprises:

transmitting, via the network interface, to an issuer associated with the cardholder, a message indicating that neither any name nor any ticket price associated with any travel transaction record of the plurality of travel transaction records is associated with the payment transaction data, wherein the message comprises an instruction to alert the cardholder to contact the issuer.

19. The non-transitory computer readable medium of claim 18, wherein the issuer is a financial institution.

20. The non-transitory computer readable medium of claim 14, wherein the registered travel information is received after the payment transaction data is received.

* * * * *